(12) United States Patent
Pfeiffer et al.

(10) Patent No.: US 8,988,503 B2
(45) Date of Patent: Mar. 24, 2015

(54) SENSING APPARATUS AND METHOD FOR DETECTING A THREE-DIMENSIONAL PHYSICAL SHAPE OF A BODY

(75) Inventors: Rene Pfeiffer, Markgroningen (DE); Dirk Rutschmann, Stuttgart (DE)

(73) Assignee: Corpus.e AG, Stuttgart (DE)

( * ) Notice: Subject to any disclaimer, the term of this patent is extended or adjusted under 35 U.S.C. 154(b) by 938 days.

(21) Appl. No.: 12/668,112
(22) PCT Filed: Jun. 19, 2008
(86) PCT No.: PCT/EP2008/004961
§ 371 (c)(1),
(2), (4) Date: May 6, 2010
(87) PCT Pub. No.: WO2009/006989
PCT Pub. Date: Jan. 15, 2009

(65) Prior Publication Data
US 2010/0238271 A1 Sep. 23, 2010

(30) Foreign Application Priority Data
Jul. 11, 2007 (DE) .......................... 10 2007 032 609

(51) Int. Cl.
*H04N 13/02* (2006.01)
*A43D 1/06* (2006.01)
(Continued)

(52) U.S. Cl.
CPC .. *A43D 1/06* (2013.01); *G01B 5/20* (2013.01); *G01B 11/24* (2013.01)
USPC .......................................................... 348/46

(58) Field of Classification Search
USPC .......................................................... 348/46
See application file for complete search history.

(56) References Cited

U.S. PATENT DOCUMENTS 4,691,398 A * 9/1987 Kadogawa et al. ................ 12/77
6,175,647 B1 1/2001 Schick et al.
(Continued)

FOREIGN PATENT DOCUMENTS

DE 197 21 903 7/1998
DE 101 13 211 A1 9/2002
(Continued)

OTHER PUBLICATIONS

Lecture entitled "3D Reconstruction of the Internal Volume of a Shoe: Evaluation of the Fit of the Shoe", on Jun. 23/24, 2005 at a Conference: Zéme Congrésdu Reseau Francias d'Ingéniére du Sport, àl'université de Valenciennes.
(Continued)

*Primary Examiner* — Dave Czekaj
*Assistant Examiner* — Tracy Li
(74) *Attorney, Agent, or Firm* — Tarolli, Sundheim, Covell & Tummino LLP

(57) ABSTRACT

A sensing device having a sensing arrangement with a sensing end (32) for coming into contact with a surface to be scanned of a body (26), a camera (30), and a connecting device (34) for rigidly connecting the camera with the sensing end, the camera being arranged such that it can detect a surface (12) which is provided with marks suitable to be automatically photogrammetrically evaluated and on which the body to be scanned has been placed, when the sensing end comes into contact with different points of the surface to be scanned of the body. The sensing device further has a photogrammetric evaluation program for a computing unit (18), the computing unit being configured such that image signals generated by the camera can be routed to the computing unit and the evaluation program can calculate the 3D coordinates of the surface to be scanned from the sequence of recorded and transmitted image sections using the marks (22) suitable to be automatically photogrammetrically evaluated. A method of detecting a three-dimensional spatial shape of a body, in particular the spatial shape of an interior of a hollow body, the method including the following steps: fastening the body to be digitized on a surface (12) which, at known positions, is provided with marks (22) suitable to be automatically photogrammetrically evaluated, and providing the sensing device. Further steps are the scanning of a point on the spatial shape to be detected by means of the sensing end (32) of the sensing arrangement (28), recording at least one section of the photogrammetrically marked surface by the camera (30) while the sensing end scans the point, a plurality of marks suitable to be photogrammetrically evaluated being detected, and repeating the steps of scanning and recording for a multitude of different points of the spatial shape to be detected. The recorded images are evaluated by an evaluation program.

24 Claims, 3 Drawing Sheets

(51) Int. Cl.
*G01B 5/20* (2006.01)
*G01B 11/24* (2006.01)

(56) References Cited

U.S. PATENT DOCUMENTS

| | | | | |
|---|---|---|---|---|
| 6,201,399 | B1* | 3/2001 | Sticha et al. | 324/663 |
| 6,429,875 | B1* | 8/2002 | Pettigrew et al. | 345/591 |
| 7,343,691 | B2* | 3/2008 | Long et al. | 33/555.4 |
| 7,433,502 | B2 | 10/2008 | Rutschmann | |
| 7,693,325 | B2* | 4/2010 | Pulla et al. | 382/154 |
| 7,697,779 | B2* | 4/2010 | Ichikawa et al. | 382/256 |
| 2002/0057429 | A1* | 5/2002 | Okahira et al. | 356/239.7 |
| 2002/0080253 | A1* | 6/2002 | Kim | 348/246 |
| 2004/0032595 | A1* | 2/2004 | Massen | 356/603 |
| 2004/0122311 | A1* | 6/2004 | Cosman | 600/427 |
| 2005/0174579 | A1* | 8/2005 | Notni et al. | 356/601 |
| 2007/0075054 | A1* | 4/2007 | Nakamura | 219/121.61 |

FOREIGN PATENT DOCUMENTS

| | | |
|---|---|---|
| DE | 103 09 788 A1 | 9/2004 |
| DE | 10 2005 039 632 A1 | 2/2007 |
| EP | 1 134 546 | 9/2001 |
| JP | 57-127804 A | 8/1982 |
| JP | 2000-125909 A | 5/2000 |
| NL | 8900820 A | 11/1990 |
| WO | WO-03/087715 A1 | 10/2003 |

OTHER PUBLICATIONS

Webpage document downloaded from www.corpus-e.com, in English discloses a light beam foot.
Webpage document downloaded from www.geodetic.com, in English.
Webpage document downloaded from www.brainiab.com, in English.

* cited by examiner

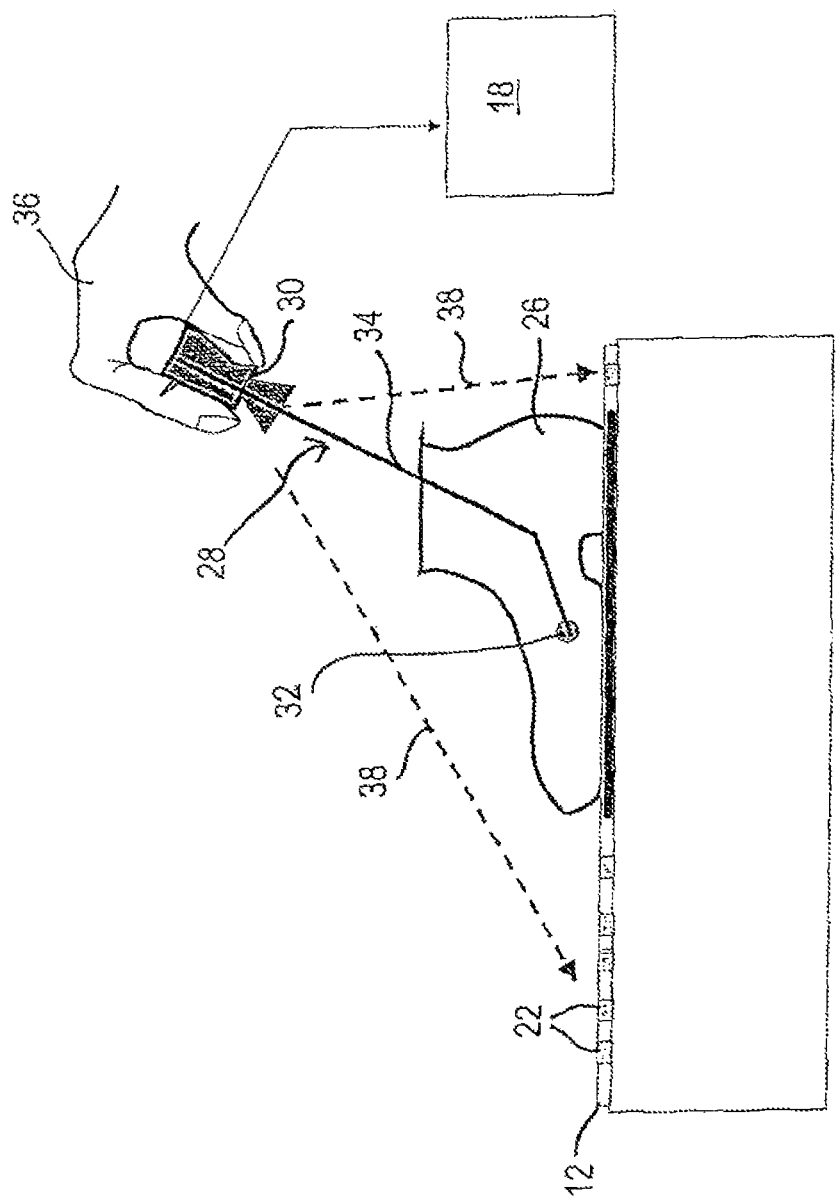

SENSING APPARATUS AND METHOD FOR DETECTING A THREE-DIMENSIONAL PHYSICAL SHAPE OF A BODY

FIELD OF THE INVENTION

The present invention relates to a sensing device and a method of detecting a three-dimensional spatial shape of a body, including a sensing end for scanning a surface to be scanned of the body, and a camera, a multitude of points on the surface to be scanned being scanned using the sensing end.

The manufacture of well fitting shoes within the scope of the so-called mass customization usually requires the 3D digitization of the spatial shape of the feet of the customer. This data is used for selecting from a collection of shoe lasts that are available physically or virtually as a 3D data set, that shoe last with which the best fitting shoe can be produced (mass customization of a best fitting shoe). In the more demanding, individual mass customization business model, an individual shoe last is fabricated from the 3D data set of the digitized foot and an individual custom-made shoe is produced hereby.

It is, to date, still very difficult to establish the 3D shape of a suitable shoe last automatically from the 3D model of a foot since a large number of other factors such as shoe style and fashionable shape, properties of materials, anatomical and biomechanical secondary conditions of the customer etc. need to be considered. Shoe lasts have a 3D shape that distinctly differs from that of the appertaining non-compressed foot. These difficulties result in that despite the increasing availability of suitable foot scanners, the business model of shoe mass customization grows only hesitantly. Since in particular low-cost and calibration-free foot scanners such as, for example, the "Lightbeam®" foot scanner of corpus.e AG, of Stuttgart, Germany (see www.corpus-e.com) have also become available in the meantime, the economic situation of mass customization of footwear is unsatisfactory because of these above-mentioned difficulties in the adaptation of the 3D foot shape to the 3D shoe last shape.

An alternative approach is to compare the 3D model of a digitized foot with the internal shape of a real shoe. This may involve, for example, the internal shapes of the shoes of a product range offered for sale, or else, the internal shapes, stored in a database, of the products of a large number of shoe manufacturers organized in a business alliance. By comparing the spatial shape of the digitized foot of a customer with a selection of internal shapes of footwear coming into consideration, the best fitting shoe can be found much more directly since the internal shape of a shoe and the 3D foot model are more similar to each other than a shoe last and a 3D foot model.

A shoe that has been worn has stored the process of adaptation to the anatomy of the foot of the wearer of the shoe. Therefore, in the case of orthopedic shoes, for example, it makes sense to make use of the internal shape of a shoe that has been worn for selecting a new shoe by comparing the internal shape of the worn shoe with the internal shapes of the shoes offered for sale.

However, the problem of nondestructive 3D digitization of the internal shape of footwear has not yet been solved satisfactorily. It is known to fill shoes with a compound and to digitize this compound. But to this end, the shoe, as a rule, has to be cut open and, hence, be destroyed.

The French institute CTC from Lyon (www.ctcgroupe.com) describes on pages 6 and 7 of its brochure CTC Enterprise International—fall 2006 a complex arrangement for digitization of the inner shoe with the aid of two endoscopic camera systems mounted in a stereo arrangement.

In the PCT publication WO 03/087715 A1 (R. Massen), a method is described in which a sock provided with photogrammetric marks is tucked into the inner shoe such that it lies against the inner wall and the marks face inwards. The interior can then be digitized photogrammetrically using one or more endoscopic camera systems. But this method is also complex and time-consuming.

BACKGROUND OF THE INVENTION

In industrial photogrammetry, systems are used in which a probe provided with bright marks arranged crosswise is manually placed point by point on a body to be measured, such as, e.g., a car body. The probe is observed by usually a plurality of high-resolution photogrammetric cameras from a relatively great distance. The internal and external parameters of these cameras are established prior to the measurement proper by means of an involved calibration. From the images of these cameras, which show the marked probe in space, the 3D point coordinates at the places, touched by the probe, of the digitized body can then be measured (see, e.g., the V-Stars system of the Australian company Geodetic Systems Inc., www.geodetic.com). When the cameras are operated in a video mode and record images of the probe continuously, this is also referred to as "videogrammetry". These systems are very involved in respect of calibration, space requirements and the very expensive photogrammetric cameras, and are therefore not suitable for use in a shoe store.

Similarly complex photogrammetric systems are known from the medical field, which measure the position of a medical device such as, e.g., a scalpel, in space. Here, in a manner similar to the V-Stars system of Geodetic Systems Inc., bright or well-reflecting marks are fastened to the scalpel handle and these marks are monitored continuously by a plurality of cameras mounted in the operating room. From the photogrammetric evaluation of the image sequences of all cameras, the respective spatial position of the scalpel marks and, derived from this, also that of the scalpel tip situated invisibly in the body, can be ascertained hereby. Such systems are available, for example, from the German company BrainLAB AG, of Munich, Germany (www.brainlab.com).

All of these expensive industrial photogrammetric [camera/marked probe] systems have in common that the very precisely marked measuring probe is detected by, as a rule, a plurality of exactly specified, oriented and calibrated cameras from a relatively great distance. They can only be operated by trained specialists or technicians, in particular also because of the calibration procedures to be repeated many times before the actual digitization starts.

There is therefore a great economic and technological interest in having a low-cost, space-saving, largely calibration-free method that is simple to operate, for a nondestructive detection of the 3D shape of the interior of new or already worn footwear, with the aid of which 3D models of the interior of footwear can be established and the best fitting shoe can be determined by comparing the 3D model of the foot of a customer with the 3D models of the interiors of shoes offered for sale. In particular, it would be of great advantage if this nondestructive detection of the 3D shapes of the interiors of shoes could be performed using the already available components of the 3D foot scanner which is required for mass customization at any rate.

SUMMARY OF THE INVENTION

This is achieved in accordance with the invention by a sensing device according to claim 1. A sensing end for scanning a surface to be scanned of a body is rigidly connected with a camera by means of a connecting device. As the sensing end moves, the camera is thus always moved along. The camera is arranged such that it can detect a surface which is provided with marks suitable to be automatically photogrammetrically evaluated and on which the body to be scanned has been placed, while the sensing end scans different points of the surface to be scanned of the body. Since, therefore, the viewing direction of the camera is substantially towards the sensing end, the surface provided with marks suitable to be automatically photogrammetrically evaluated can be part of a 3D foot scanner, and the body to be scanned is put at the place that is usually intended for the feet. In one embodiment, the surface may, however, also be part of the sensing device. Marks suitable to be automatically photogrammetrically evaluated are marks which can be automatically individually identified, e.g. by a computing unit with a photogrammetric evaluation program, and allow an exact determination of the position thereof. To this end, the marks are encoded in a suitable manner, as is known from the prior art. When the surface to be scanned is an inner wall of a hollow body, that is, for example, the internal shape of a shoe, the connecting device is configured such that the camera remains outside of the hollow body, i.e. the shoe, while the sensing end scans points in the interior of the shoe. The sensing device according to the invention further includes a photogrammetric evaluation program for a computing unit, the computing unit being configured such that image signals generated by the camera can be routed to the computing unit and the evaluation program can calculate the 3D coordinates of the spatial shape to be scanned from the sequence of recorded and transmitted image sections using the marks suitable to be automatically photogrammetrically evaluated. Owing to the rigid connection between the sensing end and the camera, the position and orientation of the camera vary with each movement of the sensing end, and a different image section is recorded each time, each of which have a plurality of marks captured thereon that are suitable to be automatically photogrammetrically evaluated and have 2D coordinates that are specific to this image section. The camera position and, thus, also the position of the sensing end can be determined from the sequence of recorded and transmitted image sections.

The sensing device allows an, e.g., tactile scanning of, more particularly, interiors of bodies and, in doing so, allows the respective spatial positions of the sensing end to be established by way of the photogrammetric image recordings of a camera that is mechanically rigidly connected with the sensing end, purely from a photogrammetrically marked base plate, i.e. the surface provided with marks suitable to be automatically photogrammetrically evaluated and on which the body is fixed in place. Any measuring mechanisms requiring time-consuming calibration are thus made dispensable. The only measuring aid, which contains absolutely precise and known distances, is the photogrammetrically marked base plate; it can be produced in a simple manner in terms of printing technology and with high absolute precision. This makes the sensing device according to the invention and the method according to the invention self-calibrating, allowing them to be employed using simple cameras and imaging optics.

In one embodiment, the sensing end includes an optoelectronic and/or acoustic distance measuring device. In this embodiment, the sensing end need not be brought, into physical contact with, e.g., the inner wall of a cavity to be digitized. The sensing end is thus in the form of an optical non-contact probe which, with a sufficient proximity to the inner wall as prescribed by the sensing arrangement, triggers an image recording or, upon reaching a release distance, marks images from a sequence of continuous images of the camera for photogrammetric evaluation.

Further preferred embodiments of the sensing device are apparent from the dependent claims.

The present invention further provides a method according to claim 12. In a preferred embodiment, the interior of a hollow body, in particular of a shoe, is detected, the camera remaining outside of the hollow body while the interior is scanned. The convex envelope of the interior is determined from an overall generated point cloud of coordinates of the interior from established positions. A comparison of the established positions of the sensing end with the convex envelope of the interior allows those points of established positions to be recognized which do not lie on the convex envelope. These points are deleted. Any errors in measurement that arise, e.g., in that the person guiding the sensing arrangement moves away from the inner wall, are thus corrected automatically by removing the incorrect measuring points. This allows the sensing arrangement to be configured particularly simply since it need not have a release contact which releases an image recording or marks an image recorded by the camera only when the sensing end is in tactile contact with the inner wall of the footwear. Rather, the moving camera records images continuously, for example, and does not require synchronization to the sensing end or to the movement.

In addition to the digitization of the internal shapes of footwear, the arrangement according to the invention and the method according to the invention are equally suited to detect the internal shapes of prosthetic funnels and similar orthopedic or prosthetic hollow bodies. Moreover, interiors of three-dimensional technical products may also be digitized. It is, of course, also possible to scan outer walls.

In addition to embodiments which provide for the sensing arrangement to be guided manually, the invention also comprises motor guides for moving the sensing end within the interior in a predefined or random movement such that numerous points on the inner wall are touched, while the camera makes recordings of the photogrammetrically marked surface at the same time. Owing to the property of self-calibration being maintained, the motor drive may be of a very simple design.

In a preferred embodiment, the method further comprises calibration steps in which the sensing arrangement, i.e. the relative position of the sensing end in relation to the origin of coordinates of the image sensor of the first camera as well as the internal parameters of the first camera are calculated. In the process, the sensing arrangement is calibrated with the aid of the same measuring installation including the photogrammetrically marked surface and the photogrammetric evaluation of the images supplied by the camera, i.e. the spatial position of the sensing end is established with respect to the coordinate system of the image sensor of the camera. For this purpose, the sensing end is fixed in place at a known position on the surface provided with marks suitable to be automatically photogrammetrically evaluated and the camera is moved on a spherical surface in space while image recordings of the photogrammetrically marked surface are made. The positions of the camera can then be calculated by an evaluation of the image recordings with the aid of the photogrammetric marks, and the exact spatial distance between the origin of coordinates of the camera sensor and the sensing end can be determined on the basis of the spherical shape of the movement.

Preferably, the positioning of the sensing end during this spherical movement is facilitated by a trough-shaped seat for receiving the sensing end in the base plate.

BRIEF DESCRIPTION OF THE DRAWINGS

Further embodiments and advantages of the invention will become apparent from the description below of a preferred embodiment. The invention will be described using the example of the combination, economically of particular interest, of the photogrammetric Lightbeam® foot scanner from the prior art with the method according to the invention and the device according to the invention for 3D detection of the interior of footwear, the following illustrations being used:

FIG. 2 schematically shows the sensing device according to the invention; and

DESCRIPTION OF PREFERRED EMBODIMENTS

Figure 1A:
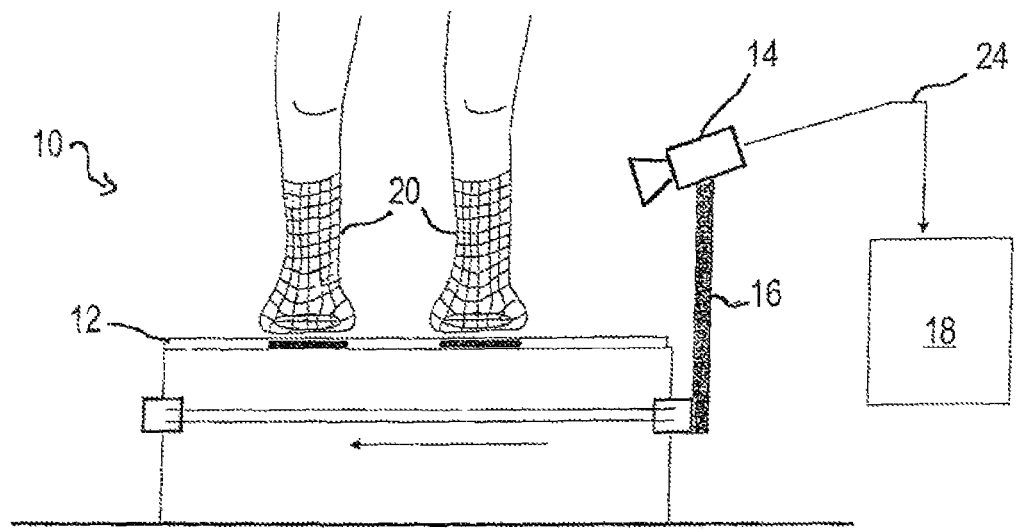
FIGS. 1A and 1B schematically show a Lightbeam® foot scanner from the prior art.
Figure 1B:
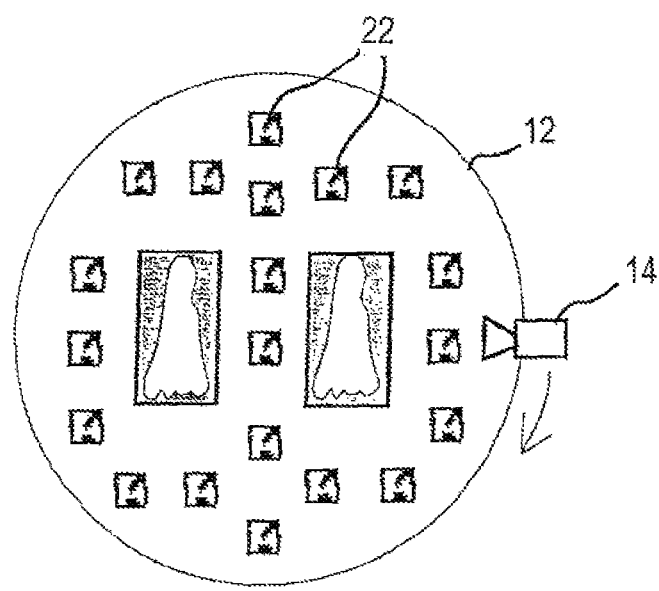

FIG. 1A shows a side view of a photogrammetric Lightbeam® foot scanner 10 from the prior art for obtaining the spatial shapes of feet, which can be supplemented in an advantageous manner by a sensing device according to the invention. The foot scanner or foot digitizer 10 includes a base plate 12, an image sensor device 14 fastened to a holder 16, and a computing unit 18. A customer pulls socks 20 over his/her feet, the socks bearing marks suitable to be photogrammetrically evaluated (see DE 10113211, "Markierungssystem für die automatische photogrammetrische Digitalisierung von Körpem and Körperteilen"). The customer stands at a predefined position on the base plate 12, which is illustrated in a top view in FIG. 1B. The base plate 12 is approximately circular and its surface is a surface provided with marks 22 suitable to be automatically photogrammetrically evaluated.

The motor-driven image sensor device 14 travels around the customer on a roughly circular path and detects the photogrammetrically marked foot/leg area 20 and a section of the likewise photogrammetrically marked base plate 12 at the same time. Using the image sensor device 14, both the foot or feet and a respective section of the marked base plate 12 are recorded out of a multitude of spatial positions here. The image data generated by the image sensor device 14 is in this way transferred via an interface 24 to a computing unit 18 for photogrammetric evaluation. The transfer is effected in any desired manner as known from the prior art, such as wire-bound, wireless, by means of a data carrier, etc. In addition to the measurement of the 3D shape of the foot or feet, this arrangement permits a precise calculation of the spatial position (i.e. the external parameters) of the image sensor device and of the internal parameters thereof at the same time, so that this system has the great advantage of an inherent self-calibration.

In accordance with the invention, a similar basic arrangement is employed for digitization of the internal shape of footwear. FIG. 2 shows, in a side view, a shoe 26 having an interior that is to be digitized. The shoe 26 is positioned and fixed in place on the photogrammetrically marked base plate 12 having marks 22. In an economically favorable way, the base plate is that of the foot scanner 10 where provision is already made for fixing devices. But of course any other surface may also be used that is provided with marks suitable to be automatically photogrammetrically evaluated.

FIG. 2 further shows a sensing arrangement 28 having a camera 30, a sensing end 32, and a connecting device 34 for rigidly connecting the camera 30 with the sensing end 32. Advantageously, the connecting device 34 is in the form of a bent rod, so that the sensing end 32 can be guided to all or approximately all of the points of the inner wall of the shoe while the camera 30 remains outside of the shoe at all times. The form of the connecting device 34 may be adjusted to the respective measuring jobs. Rather than one camera, it is possible to provide two or more cameras which then view the surface 12 at different angles. A hand 36 guides the sensing arrangement 28 manually. Provision may, however, also be made for a motor-driven guidance of the sensing arrangement 28. Dashed arrows 38 indicate the image field of the camera 30. The camera 30 or cameras is/are arranged such that it/they essentially point(s) towards the sensing end. As a result, the camera 30 is arranged to detect, within the image field, sections of the surface 12 provided with the marks 22 that are suitable to be automatically photogrammetrically evaluated when the shoe 26 that has been placed on the photogrammetric surface 12 is scanned. The images recorded by the camera 30 are transferred as image signals to the computing unit 18. When the sensing arrangement 28 is used together with the foot scanner 10, it is possible to use the computing unit of the foot scanner 10, which has been supplemented by capabilities of evaluation corresponding to those of the sensing arrangement 28. But it is, of course, also possible to use a different, separate, computing unit with an appropriate evaluation program. The image signals from the camera 30 are transferred to the computing unit 18 in any desired form known from the prior art, wire-bound, wireless, by way of a data carrier, by radio or by other means.

For the scanning process, the sensing arrangement 28 is guided manually or motor-powered such that the sensing end 32 scans the inner walls of the shoe 26 at numerous points and, from its spatial positions, the camera 30 continuously records image sections of the photogrammetrically marked base plate 12 and transfers them via an interface to the computing unit 18 for photogrammetric evaluation. The camera 30 preferably operates in a video mode here. The inner walls need not be scanned on a predefined path; rather, the scanning may be performed freely on any desired non-systematic path.

In a first embodiment, the sensing end 32 mainly contacts the inner wall of the footwear 26 to scan it mechanically; here, the sensing end 32 may be fitted with a mechanical and/or optical and/or inductive and/or acoustical contact mechanism which upon contact with the inner wall generates a contact signal. Either an image is not recorded until triggered by the contact signal, or, preferably, the camera 30 records images continuously in a video mode and, based on the contact signal, those images are selected which were recorded at the moments the contact signals were supplied.

In a second embodiment, the sensing end 32 disposes of a mechanically linearly resiliently displaceable sensing tip having a linear displacement sensor. Upon contact of the sensing tip with the inner wall of the shoe 26, a displacement signal is transferred from the linear displacement sensor to the computing unit 18. A correction vector is calculated from the displacement signal and is added in the computing unit 18 to the space coordinates, photogrammetrically established, of the sensing end 32. This allows the coordinates of the inner wall to be established without the sensing tip mechanically loading the inner wall with any appreciable forces. The second embodiment may be combined with the first embodiment.

In a third embodiment, the sensing end 32 disposes of an opto-electronic and/or acoustic distance measuring device for measuring a distance of the sensing end 32 from the spatial shape in at least one defined direction. The measured distance is transferred to the computing unit 18 and a correction vector is calculated from the measured distance. This correction vector is added to the space coordinates of the sensing end 32 photogrammetrically established from the images recorded by the camera 30. In this way, the coordinates of the inner wall are established without the sensing end 32 mechanically contacting the inner wall.

In all of the embodiments, the camera 30 preferably permanently records images of the photogrammetrically marked base plate 12 during the scanning of the inner wall and transfers these images to the computing unit 18, which uses these image sequences to calculate, applying the methods of photogrammetry known to those skilled in the art, the respective spatial position of the camera 30 and, derived therefrom, the spatial position of the sensing end 32 rigidly connected with the camera 30. This produces a point cloud of spatial points, the vast majority of which consists of space coordinates of the inner wall of the footwear, mixed with few spatial points that reproduce sensing positions in the interior of the cavity, especially when no contact signal is used.

As already set forth above, the sensing device is self-calibrating since the images recorded always include marks 22 suitable to be photogrammetrically evaluated which are located at known positions. However, the sensing arrangement 28 itself requires calibration, i.e. the relative position of the sensing end 32 in relation to the origin of coordinates of the image sensor of the camera 30 and the internal parameters of the camera 30 need to be calculated. The distance between the camera 30 and the sensing end 32 and the orientation of the camera 30 and the sensing end 32 in relation to each other are calculated. This is important in, particular when the shape of the connecting device 34 is adjusted to the respective measuring job. In doing so, the sensing arrangement 28 is calibrated with the aid of the same measuring installation comprising the photogrammetrically marked surface and the photogrammetric evaluation of the images supplied by the camera, i.e. the spatial position of the sensing end 32 is established with respect to the coordinate system of the image sensor of the camera 30. To this end, the sensing end 32 is fixed in place at a known position on the surface 12 provided with marks 22 suitable to be automatically photogrammetrically evaluated; in the preferred embodiment a small trough is provided in the base plate 12 for this purpose. The camera 30 is then moved manually or motor-powered on a spherical surface in space, the camera 30 making image recordings of the photogrammetrically marked surface 12. The positions of the camera 30 can then be calculated by an evaluation of the image recordings with the aid of the photogrammetric marks 22, and the exact spatial distance between the origin of coordinates of the camera sensor and the sensing end 32 can be determined on the basis of the spherical shape of the movement.

Figure 3:
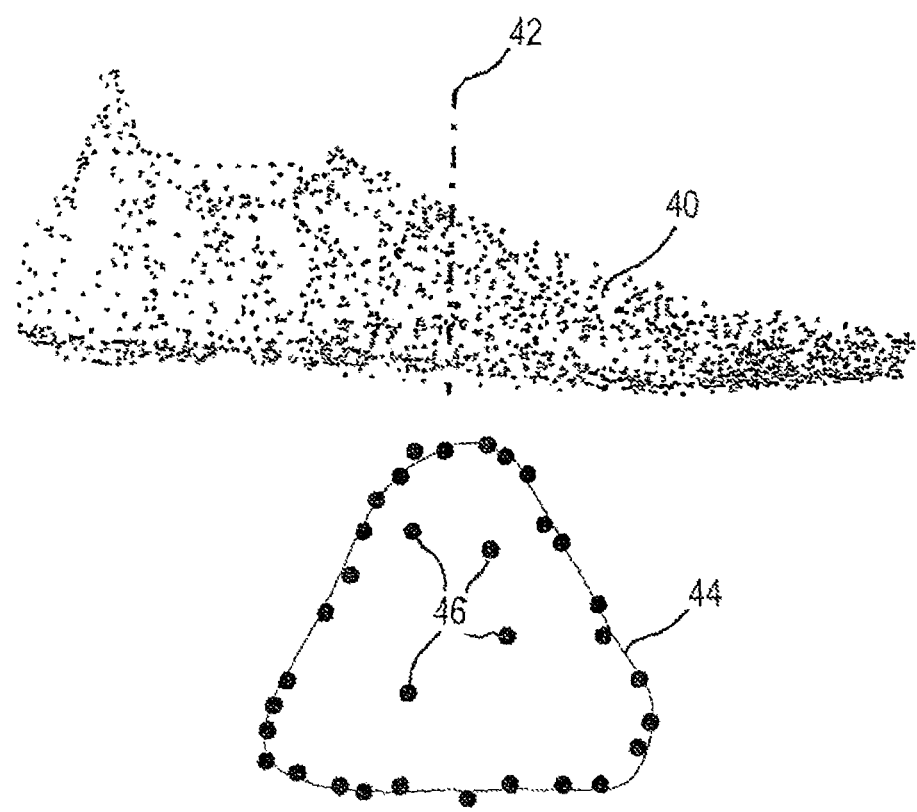
FIG. 3 shows a side view of a point cloud of a 3D spatial shape as established of an inner shoe and a section taken through the point cloud and thus the associated convex envelope of the inner spatial shape.

FIG. 3 shows a side view of a point cloud 40 as is calculated by way of example in the computing unit 18 for the 3D spatial shape of the inner wall of the shoe 26. Along a cutting line 42, a convex envelope 44 of the interior is produced as is established from the point cloud by the computing unit 18. It can be seen that points 46 of the point cloud 40 do not lie on the envelope 44. The evaluation program is configured such that it recognizes points that do not lie on the convex envelope of the internal spatial shape and, out of the generated point cloud, thus automatically identifies such points as not being part of the internal shape of the footwear and deletes them from the 3D model.

The points 46 are such spatial points that were established based on sensing arrangement positions in which the sensing end 32 had not momentarily contacted the inner wall. They are easy to identify and to delete since these spatial points lie in the interior of the 3D point cloud of the inner shoe.

Accordingly, the method according to the invention, which uses the sensing device according to the invention, allows a large number of spatial points of the inner wall of a footwear to be obtained in a very short time in a very simple manner and also allows an available photogrammetric foot scanner from the prior art to be advantageously used at the same time.

While the invention is not limited to this particularly economical combination of a photogrammetric 3D foot scanner and a photogrammetric-tactile inner shoe scanner, i.e. the sensing device according to the invention, the method and the sensing device described here by way of example show how small the additional expenditure is for the digitization of an inner shoe in comparison with a mere foot digitization. This especially facilitates to achieve the above-mentioned object to use the 3D model of a foot of a customer together with a data base of stored 3D models of the inner shoes of shoe models coming into consideration for selecting suitable, well-fitting shoes.

The invention can also assist in determining a fitting footwear in that the interior of a well-fitting shoe of a customer, which has already been worn in by wearing it, is digitized and that this 30 model of the worn-in inner shoe is compared with the interiors of the shoe models available in a data base, or an individual well-fitting footwear is manufactured on the basis of this deformed 3D model of the inner shoe. Especially in the case of orthopedic footwear, an inner shoe that has been deformed by wearing the shoe constitutes a more valuable 3D model than the directly digitized foot of the patient, since it reflects the history of the deformations of the footwear.

In a preferred embodiment, the sensing device is a supplement to a 3D foot scanner 10 and comprises a mount. The mount can be connected with the holder 16 of the foot scanner 10 such that the sensing arrangement 28 can be mounted in the mount in such a way that for the digitization of a foot using the photogrammetric foot scanner 10, the image sensor device 14 can detect the foot or feet to be digitized together with sections of the photogrammetrically marked surface 12, without the sensing arrangement 28 protruding in a disturbing manner into the measurement space to be digitized.

This may be achieved, for example, in that when the sensing arrangement 28 is hung on the holder 16 of the foot scanner 10, the image sensor device 14 detects the foot to be digitized via a deflecting mirror, undisturbed by the sensing arrangement.

The best fitting shoe is then established by comparing the 3D model of a customer's foot with the 3D models of the interiors of shoes that are offered. As an alternative, the 3D information of the shoe lasts associated with the shoes offered is made use of in addition to the 3D information of the interior of the shoes offered, for selecting the best fitting shoe (best fit customization).

The invention claimed is:
1. A sensing device for detecting a three-dimensional spatial shape of a body, comprising a sensing arrangement (28) which sensing arrangement comprises:
   a sensing end (32) for scanning a spatial shape to be scanned of a body;
   a camera (30);

a connecting device (34) for rigidly connecting the camera (30) with the sensing end (32), wherein the rigid connection establishes a spatial position between the camera (30) and the sensing end (32), the camera (30) being arranged such that it can detect a surface (12) which is provided with marks (22) suitable to be automatically photogrammetrically evaluated and on which the body to be scanned has been placed, while the sensing end (32) scans different points of the spatial shape to be scanned of the body; and the sensing device further comprising:

a photogrammetric evaluation program for a computing unit (18), the computing unit being configured such that image signals generated by the camera (30) can be routed to the computing unit (18) and the photogrammetric evaluation program can calculate the 3D coordinates of the spatial shape to be scanned by the sensing end (32) from the sequence of recorded and transmitted image sections by automatically photogrammetrically evaluating the captured marks (22) in the recorded and transmitted image sections and by determining a position of the camera (30) from the known exact space coordinates of the marks (22), the photogrammetric evaluation program being configured to determine a position of the sensing end (32) scanning different points of the spatial shape from the determined position of the camera (30) and the spatial position of the sensing end (32) with respect to the camera (30).

2. The sensing device according to claim 1, wherein the spatial shape to be scanned of a body (26) is an inner wall of a hollow body.

3. The sensing device according to claim 1, wherein the camera operates in a video mode and records images continuously.

4. The sensing device according to claim 1, wherein an origin of coordinates of the photogrammetrically marked surface (12) has a trough for accommodating the sensing end (32).

5. The sensing device according to claim 1, comprising at least two cameras (30), wherein the cameras are arranged such that a plurality of image sections of the photogrammetrically marked surface (12) is detected at the same time.

6. The sensing device according to claim 1, wherein the sensing end (32) exhibits a mechanical and/or optical and/or inductive and/or acoustic contact mechanism which generates a contact signal upon contact with the inner wall.

7. The sensing device according to claim 6, wherein image signals generated by the camera (30) or the at least two cameras are passed on to the computing unit (18) or are marked before being passed on to the computing unit only when the contact signal has been generated during recording.

8. The sensing device according to claim 1, wherein the sensing end (32) comprises an opto-electronic and/or acoustic distance measuring device.

9. The sensing device according to claim 1, wherein the sensing end (32) comprises a mechanically linearly resiliently displaceable sensing tip having a linear displacement sensor.

10. The sensing device according to claim 1, wherein the sensing device is a supplement to a photogrammetric foot digitizer (10) which includes a photogrammetrically marked surface (12) and an image sensor device (14), the image sensor device (14) being guided around a body to be digitized, using a holder (16), and wherein the sensing device comprises a mount which can be connected with the holder (16) of the image sensor device (14) of the foot digitizer (10) and in which the sensing arrangement (28) can be removably mounted, and the sensing arrangement (28) being oriented in the mount such that the sensing arrangement only insignificantly conceals the image field of the image sensor device (14) on the body to be digitized and the photogrammetrically marked surface (12).

11. A method of detecting a three-dimensional interior spatial shape of a hollow body, the method comprising the following steps:

fastening the body (26) to be digitized on a surface (12) which, at known positions, is provided with marks (22) suitable to be automatically photogrammetrically evaluated;

providing a sensing device for detecting a three-dimensional (3D) spatial, the sensing device comprising:

a sensing arrangement (28) comprising a sensing end (32) for scanning a spatial shape to be scanned of a body;

a camera (30);

a connecting device (34) for rigidly connecting the camera (30) with the sensing end (32), wherein the rigid connection establishes a spatial position between the camera (30) and the sensing end (32), the camera (30) being arranged such that it can detect a surface (12) which is provided with marks (22) suitable to be automatically photogrammetrically evaluated and on which the body to be scanned has been placed, while the sensing end (32) scans different points of the spatial shape to be scanned of the body; and the sensing device further comprising:

a photogrammetric evaluation program for a computing unit (18), the computing unit being configured such that image signals generated by the camera (30) can be routed to the computing unit (18) and the photogrammetric evaluation program can calculate the 3D coordinates of the spatial shape to be scanned by the sensing end (32) from the sequence of recorded and transmitted image sections by automatically photogrammetrically evaluating the captured marks (22) in the recorded and transmitted image sections and by determining a position of the camera (30) from the known exact space coordinates of the marks (22), the photogrammetric evaluation program being configured to determine a position of the sensing end (32) scanning different points of the spatial shape from the determined position of the camera (30) and the spatial position of the sensing end (32) with respect to the camera (30)

scanning the spatial shape to be detected by means of the sensing end (32) of the sensing arrangement (28);

recording at least one section of the photogrammetrically marked surface (12) by the camera (30) while the sensing end (32) scans a point of the 3D spatial shape of the body (26), a plurality of marks (22) suitable to be photogrammetrically evaluated being detected;

repeating the steps of scanning and recording for a multitude of different points of the 3D spatial shape to be detected;

evaluating the recorded images by the photogrammetric evaluation program on a computing unit (18), the photogrammetric evaluation program determining, by a photogrammetric evaluation of the image sequences, the respective spatial position and the respective orientation of the camera (30) from the known exact space coordinates of the photogrammetric marks (22) detected by the camera (30) and deriving the respective spatial position of the sensing end (32) rigidly connected with the camera (30) from the camera position and camera orientation and the spatial position between the sensing end (32) and the camera (30), and the 3D model of the body (26), in particular the interior of a hollow body and/or geometric measurements of the interior, being established from the spatial positions of the sensing end (32) scanning the 3D spatial shape of the body (26).

12. The method according to claim 11, wherein the scanning of the spatial shape is effected in a continuous movement of the sensing end (32) and wherein the camera (30) makes recordings continuously in a video mode.

13. The method according to claim 11, wherein the interior spatial shape of the hollow body, in particular of a shoe, is detected, and wherein the camera (30) remains outside of the hollow body while the interior is scanned.

14. The method according to claim 13, further comprising the following steps:
   determining a convex envelope (44) of the interior from an overall generated point cloud of coordinates of the interior from established positions;
   comparing the established positions of the sensing end (32) with the convex envelope of the interior;
   deleting points of established positions that do not lie on the convex envelope.

15. The method according to claim 11, wherein the sensing end (32) includes a mechanical and/or optical and/or inductive and/or acoustic contact mechanism which upon contact generates a contact signal, and wherein only those camera images in which the contact signal has been generated are passed on to the computing unit (18) or are marked before being passed on to the computing unit (18).

16. The method according to claim 11, wherein the sensing end (32) disposes of an opto-electronic and/or acoustic distance measurement, and the method further comprises the following steps:
   measuring a distance of the sensing end (32) from the spatial shape in at least one defined direction;
   transferring the measured distance to the computing unit (18) and calculating a correction vector from the measured distance;
   adding the correction vector to the space coordinates of the sensing end (32) that have been photogrammetrically established from the image recordings of the camera (30).

17. The method according to claim 11, wherein the sensing end (32) disposes of a mechanically linearly resiliently displaceable sensing tip having a linear displacement sensor, and the method further comprises the following steps:
   transferring a displacement signal from the linear displacement sensor to the computing unit (18) upon contact of the sensing tip with the inner wall and calculating a correction vector from the displacement signal;
   adding the correction vector to the space coordinates of the sensing end (32) that have been photogrammetrically established from the image recordings of the camera (30).

18. The method according to claim 11, wherein the method further comprises the following calibration steps:
   placing the sensing end (32) on a defined point, preferably an origin of coordinates of the photogrammetrically marked surface (12);
   moving the camera (30) on a spherical surface around this point, the sensing end (32) remaining in contact with the photogrammetrically marked surface (12) during the movement;
   recording a sequence of images during the movement and passing it on to the computing unit (18);
   calculating the relative position of the sensing end (32) in relation to the origin of coordinates of the image sensor of the camera (30) as well as the internal parameters of the camera (30) from the sequence of images recorded by the camera.

19. The method according to claim 11, wherein the scanned spatial shape is the interior of a body (26) that has been deformed by use and/or stress, and wherein the calculated 3D model and/or the calculated geometric measurements of this interior deformed by use is/are made use of for selecting and/or manufacturing a new body.

20. The method according to claim 11, wherein the spatial shape to be scanned pertains to any one of the following bodies:
   a footwear;
   a headgear and/or a headguard;
   a covering for clothing and/or protecting the human or animal body;
   an orthopedic and/or prosthetic product having an interior that is open to the outside and presents a spatial surface area to be adjusted to an anatomy of a patient requiring orthopedic and/or prosthetic care.

21. The method according to claim 11, wherein the sensing arrangement is mechanically moved by a motor drive such that the sensing end (32) contacts as many points as possible of the interior of the body.

22. The method according to claim 11, wherein the spatial shape to be scanned comprises a footwear, particularly a shoe, and the 3D spatial shape of the body comprises a 3D model of the shape of the interior of the shoe, the method further comprising the steps of:
   providing a database in which 3D models of shapes of the interiors of available shoes are stored;
   scanning a foot of a customer using a photogrammetric 3D foot scanner for obtaining a digital 3D model of the customer foot;
   comparing the 3D model of the customer foot with the 3D models of interior shapes of available shoes stored in the database; and
   selecting a shoe of which the 3D model of interior shape is the most similar to the 3D model of the customer foot.

23. The method of claim 22, wherein the database contains digital 3D models of internal shapes of shoes produced by shoe manufacturers organized in a business alliance.

24. The method of claim 22 further comprising producing the 3D models of shapes of the interiors of available shoes as point clouds.

* * * * *